US008601381B2

(12) United States Patent
Roseway et al.

(10) Patent No.: US 8,601,381 B2
(45) Date of Patent: Dec. 3, 2013

(54) RICH CUSTOMIZABLE USER ONLINE ENVIRONMENT

(75) Inventors: Asta Roseway, Redmond, WA (US); Carolyn J. Fuson, Bellevue, WA (US); Jeffrey S. Davison, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1009 days.

(21) Appl. No.: 11/927,524

(22) Filed: Oct. 29, 2007

(65) Prior Publication Data

US 2009/0113318 A1    Apr. 30, 2009

(51) Int. Cl.
*G06F 3/00* (2006.01)

(52) U.S. Cl.
USPC ........... 715/762; 715/733; 715/744; 715/746; 715/747

(58) Field of Classification Search
USPC .................................. 715/733, 744–747, 762
See application file for complete search history.

(56) References Cited

U.S. PATENT DOCUMENTS

| | | | |
|---|---|---|---|
| 6,144,375 A | 11/2000 | Jain et al. | |
| 6,405,221 B1 | 6/2002 | Levine et al. | |
| 6,917,362 B2 | 7/2005 | Pinedo et al. | |
| 7,185,290 B2 * | 2/2007 | Cadiz et al. | 715/838 |
| 7,802,207 B2 * | 9/2010 | Agboatwalla et al. | 715/866 |
| 2002/0023230 A1 | 2/2002 | Bolnick et al. | |
| 2002/0091762 A1 * | 7/2002 | Sohn et al. | 709/203 |
| 2003/0076367 A1 | 4/2003 | Bencze et al. | |
| 2005/0096983 A1 | 5/2005 | Werkhoven | |
| 2005/0204276 A1 * | 9/2005 | Hosea et al. | 715/501.1 |
| 2005/0204309 A1 | 9/2005 | Szeto | |
| 2006/0026534 A1 | 2/2006 | Ruthfield et al. | |
| 2006/0129544 A1 | 6/2006 | Yoon et al. | |
| 2006/0179455 A1 | 8/2006 | Jun et al. | |
| 2006/0212696 A1 * | 9/2006 | Bustelo et al. | 713/150 |
| 2006/0224967 A1 * | 10/2006 | Marmaros | 715/738 |
| 2007/0162862 A1 * | 7/2007 | Ogasawara et al. | 715/751 |
| 2008/0072247 A1 * | 3/2008 | Barnard | 725/32 |
| 2008/0120277 A1 * | 5/2008 | Pettinati et al. | 707/3 |
| 2009/0024930 A1 * | 1/2009 | Kim | 715/744 |

OTHER PUBLICATIONS

Unknown,"Windows Live," available at http://get.live.com/#, 2007, 1 page.

(Continued)

*Primary Examiner* — Ramsey Refai
*Assistant Examiner* — Meseker Takele
(74) *Attorney, Agent, or Firm* — Senniger Powers LLP (57) ABSTRACT

Providing a customizable online environment for a user on a client. An instruction is received from the user for assigning a background image for the online environment. The online environment is to be rendered on a display of the client. One or more graphical elements are identified on the background image. A profile is received from the user, and the profile includes a plurality of user-customizable data each having properties associated therewith. Graphical representations are provided for the plurality of user-customizable data. Each of the graphical representations depends on and visually indicates the properties associated with each of the plurality of user-customizable data. The provided graphical representations are rendered onto a position of the background image on the online environment. The position of the rendered graphical representation depends on the properties of the user-customizable data corresponding to the graphical representation and the identified graphical elements of the background image.

20 Claims, 9 Drawing Sheets

(56) References Cited

OTHER PUBLICATIONS

Roth, Steven F. et al, "Towards an Information Visualization Workspace: Combining Multiple Means of Expression," Human-Computer Interaction Journal, 1997, available at http://www.cs.cmu.edu/~sage/PDF/Towards.pdf, 1997, 64 pages, vol. 12, Nos. 1 & 2, USA.

Wang, Y. et al, "Content-oriented Presentation and Personalized Interface of Cultural Heritage in Digital Dossiers," Proc. InSciT2006, available at http://www.win.tue.nl/~ywang/publications/paper-presentation.pdf, Oct. 25-28, 2006, 5 pages, Merida, Spain.

* cited by examiner

FIG. 1

PRIOR ART

RICH CUSTOMIZABLE USER ONLINE ENVIRONMENT

BACKGROUND

The ever-expanding bandwidth for internet services increases online users' continued desire to receive more and richer content from online or web providers. Video data and graphically oriented content can now stream or transmit faster to a user's client device. Furthermore, the users have also become savvier in customizing how they receive content over the internet or other networks. For example, online users, through their computer, game console, online television box or the like, typically may register to establish a portal-like online environment where their favorite news source, local weather, movie show times, electronic mail (e-mail) notifications, or the like are received. These data aggregation portals or web services typically offer a homepage summary view where the user can go to see his/her selected set of services. With this homepage, the user can get a "summary" of communications, news and other services in one place and within a predefined display configuration.

Figure 1:
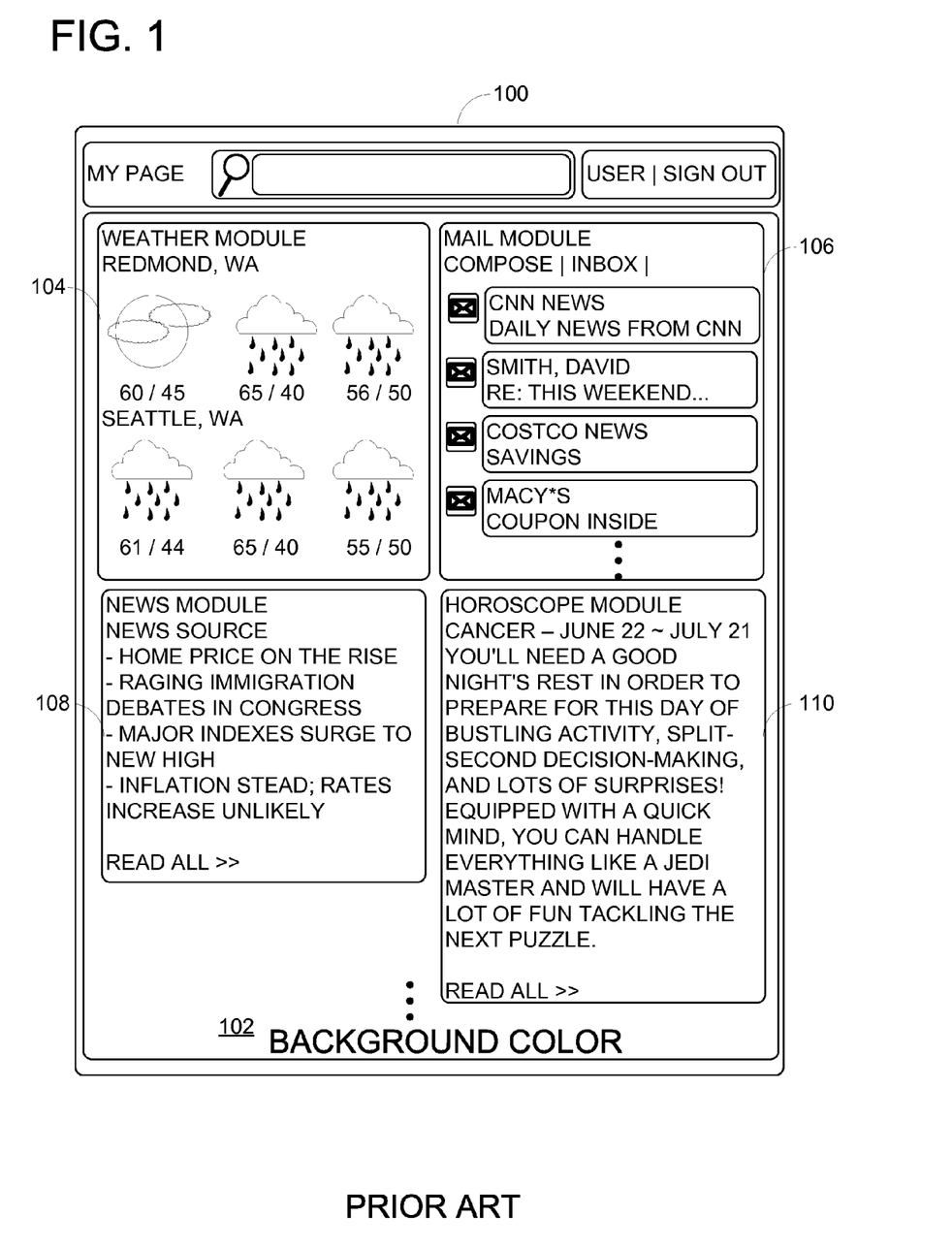
FIG. 1 is an existing embodiment of an online environment through a use of a homepage.

For example, FIG. 1 illustrates a typical configuration of an online environment using a homepage 100. For example, the homepage 100 typically has a background color 102 covering the entire homepage 100. The homepage 100 also includes one or more modules or application widgets that provide services to the user. These modules or application widgets are holders for particular content for the user. For example, a weather module 104 may provide three-day forecast weather information for the user for a given location. The user may have an option to select one or more locations. An e-mail module 106 may also provide a short and brief listing of the user's e-mail messages in the user's inbox. A news source module 108 may include one or more news headlines from a user's favorite news sources. A horoscope module 110 may provide horoscope information for a selected zodiac. The service providers typically also enable dynamic updates or renderings of these modules.

Currently, this homepage online environment is preferred over other rich user experience methods because of its quick loading performance. However, such model's shortcomings and problems include leaving the texts of modules becoming static when the dynamic connection of the network/services is lost. Furthermore, the homepage typically becomes a collection of information where management of the information is overwhelming. In addition, the modules and the homepage are text-based or text-oriented. Furthermore, user customization of the homepage is limited to the selection of the background color, the relative position of the modules, the amount of content (e.g., 5 or 7 headlines for a given news source), and the number of modules a user may select. Hence, the homepage presents a flat, two dimensional and unanimated interfaces.

SUMMARY

Embodiments of the invention provide technical solutions with a rich and customizable user online environment in which users can experience information with fuller and livelier presentation. Embodiments of the invention enable the users to receive information more intuitive and graphically without being overwhelmed. Aspects of the invention enable a user to assign a customized image as a background image for the online environment and enable the user to see graphical representations of desirable content as part of the background image. For example, instead of showing a raining icon in a user's weather module in FIG. 1, aspects of the invention beneficially provide rain drop graphics on the background image directly such that the background image appears to incorporate the rain drop graphics.

Further aspects of the invention provide technical effects that also identify graphical elements of the background image such that the user may assign a particular graphical element to be an anchor for reflecting or for pinning other customizable content. For example, suppose a user may assign a background image with Seattle skyline. The user may identify The Space Needle to be an anchor or point for popping a small window showing available sales event from the user's favorite coffee shop. Alternative embodiments of the invention enable third party services to provide advertisement through the identified graphical elements of the background image. As such, the users can now experience fuller and graphically richer presentations of the user's online environment (such as people, events, or places) condensed onto the background of the online environment. Further embodiments of the invention render this online environment on the user's personal computer, portable devices, home television, or even an application or software.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Aspects of the invention attempt to mirror a user's reality in a rich virtual or online environment. For example, suppose a user has indicated to a server system that the user resides in San Francisco, Calif., and the user desires to receive local weather information to the user's online environment. Aspects of the invention enable the server system to integrate the weather information or condition to the background image of the online environment. At the same time, any contacts in the user's contact list who also share that location may appear, represented by graphical icons, on the background. As such, embodiments of the invention provide the user with a passive viewing experience that is wrapped in emotional and relevant intent through the rich visualization of the online environment. Embodiments of the invention solve at least some of the problems by enabling the user to identify information in a way that closely mimics the way humans think, rather than asking the user to seek out various information across the homepage or homepages.

In one embodiment, the online environment describes a user experience in which the user visits a centralized web location hosted by a remote server or device from the user's local device or application through a wired or wireless connection. The centralized web location provides or pushes the information displayed or rendered on the web location. As such, as soon as the user leaves the centralized web location, the information in the online environment is no longer accessible until the user visits the web location in a next session or occasion. In another embodiment, the online environment with information included therewith may be persisted on the local device or application even though the connection is no longer active or connected.

Aspects of the invention further enable the online environment with ability to integrate and display related information such as, place, time, communications, and environment in a clear way: all are addressed in a single logical application in the online environment. This online environment takes static 2-dimentional information sets and displays them in a more humanly intuitive way.

Figure 2:
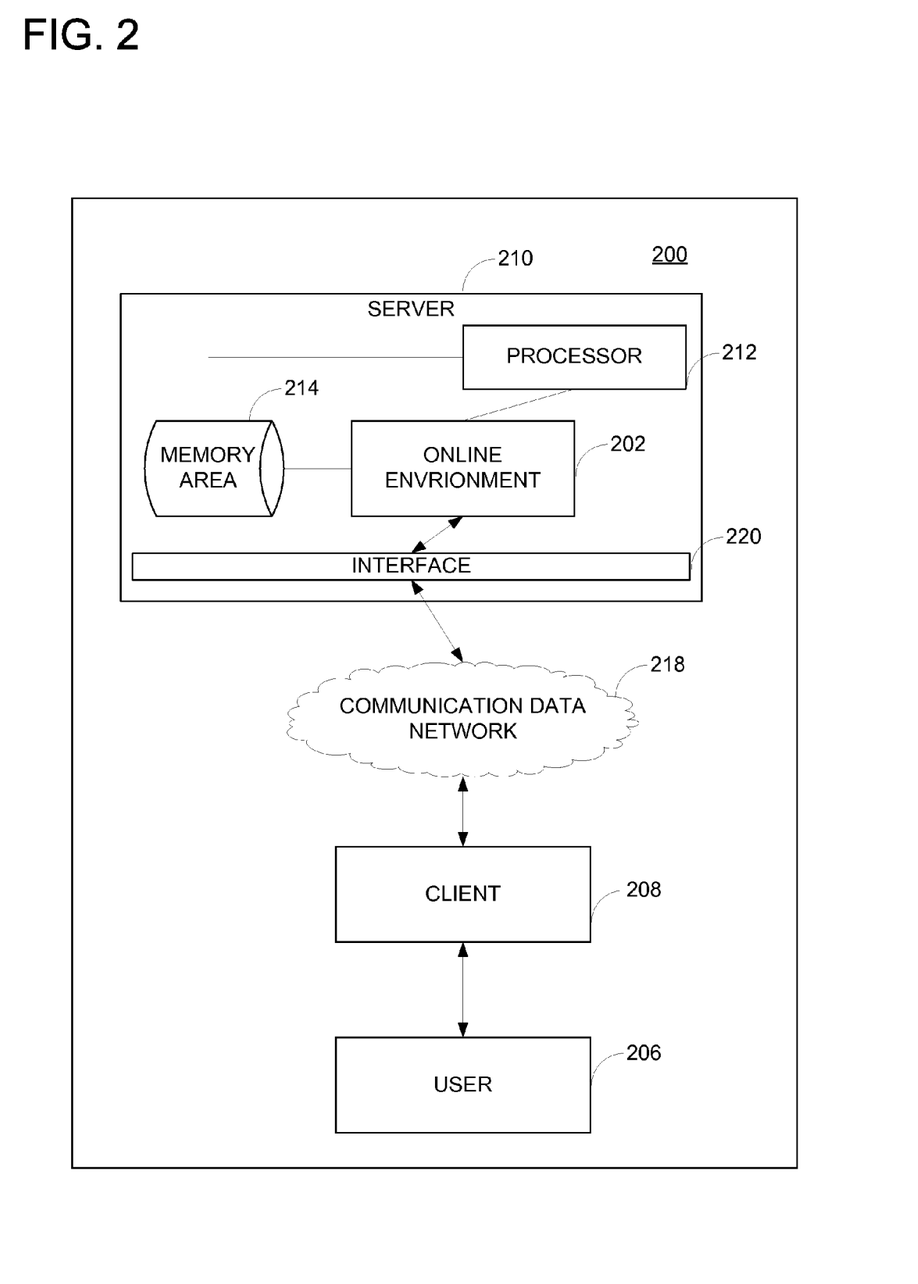
FIG. 2 is an exemplary block diagram illustrating a system for providing a customizable and rich online environment for a user on a client according to an embodiment of the invention.

Referring now to FIG. 2, a block diagram illustrates a system 200 for providing a customizable and rich online environment 202 for a user 206 on a client 208 according to an embodiment of the invention. The system 200 includes a server 210 which provides services to the client 208 and hosts the online environment 202. In one embodiment, the server 210 may be a computing device, a cluster of computing devices, or a federation of computing devices. In another embodiment, the server 210 may include a web server, an authentication server, one or more back-end servers, one or more front-end servers, database servers, or any combination thereof. It is to be understood that other types of server computing devices or computing units may be part of the server 210 without departing from the scope of aspects of the invention.

The server 210 also includes a processor 212 and a memory area 214 accessible by the server 210 and/or the processor 22. In one example, the processor 212 may be a processing unit or a collection of processing units. The memory area 214 may be a data store, a database, a collection of data stores or databases, or the like. The server 210, the processor 212, the memory area 214, and the online environment 202 are accessible among each other via a communication data network 218. The communication data network 218 may be any wireless or wired data network. For example, the communication data network 218 may be an intranet or an internet.

The online environment 202 provided or serviced by the server 210 includes a particular online source for the user 206 to receive information. It is known that the user 206 may receive information from various sources, such as through e-mail messages, instant message chat sessions, web logs (blogs), news services, or the like. The online environment 202 according to embodiments of the invention provides a centralized or an aggregated source of information for the user 206. Unlike the existing homepage model shown in FIG. 1, the online environment 202 provides a rich and customizable environment displaying information to the user 206 in an intuitive and graphically rich visualization such that the user 206 can quickly identify the desired information.

The system 200 also includes an interface 220 which may be a hardware interface device or an online interface, such as a web site or a web portal within a web site. In one embodiment, the online environment 202 is provided to the client 208 accessible by the user 206 via the interface 220. The client 208 may be a hardware client device, such as a personal computer, a television, a portable device (e.g., a mobile phone, a portable media device, or a personal digital assistance (PDA)), a game console, or other types of client device. The client 208 may also be a client application or software, such as an instant messaging application, a communication application or the like.

Figure 3:
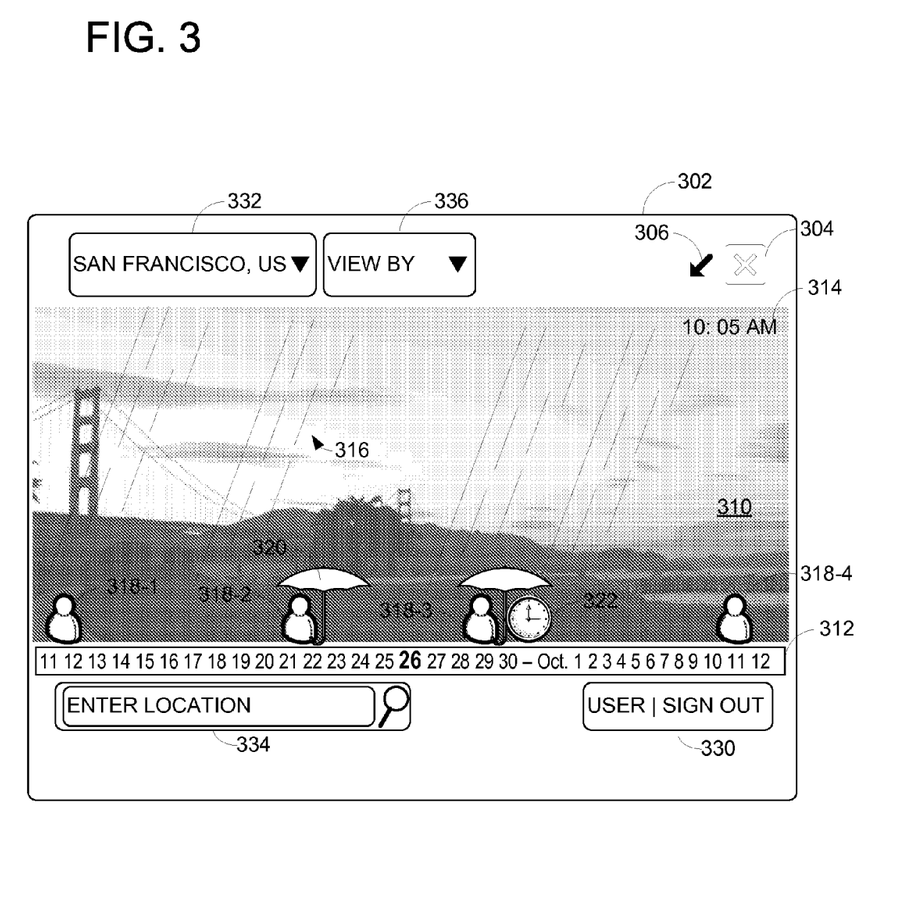
FIGS. 3 to 7 are exemplary screen displays showing customizable and rich user online environment according to an embodiment of the invention.
Figure 4:
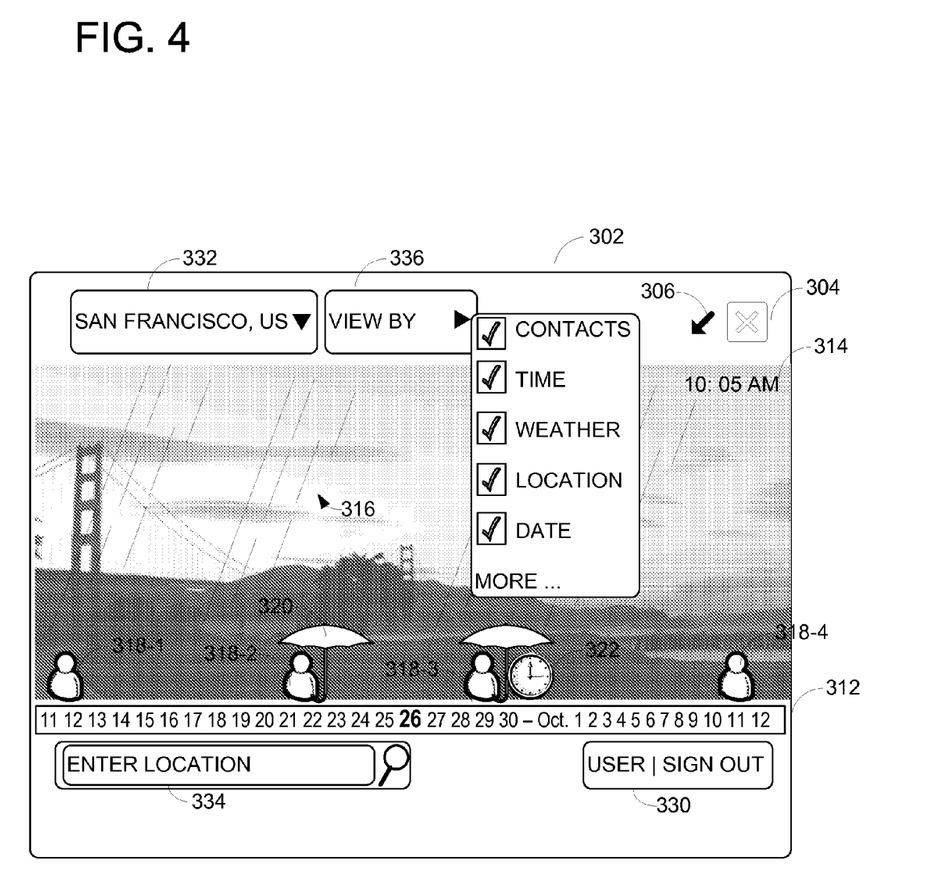

FIGS. 3 to 7 illustrate a series of exemplary screen displays showing aspects of the online environment 202 according to an embodiment of the invention. In one aspect, embodiments of the invention produce technical effects shown in FIGS. 3 to 7 in solving at least some of the shortcomings or problems experienced by the prior art. FIG. 3 illustrates one embodiment of the online environment 302. In one embodiment, the online environment 302 may be embodied or incorporated within a display window of a client application or a client device. For example, the online environment 302 may display all elements there within one display window shown in FIG. 3. Accordingly, the online environment 302 may include one or more common controls represented by graphic elements or icons, such as a close window control 304 and a "pin to the desktop" control 306. For example, the "pin to the Desktop" control 306 may "pin" or affix the online environment 302 to a particular location or position on the client display space. Other controls or graphical representations for the controls may be incorporated without departing from the scope and spirit of aspects of the invention. For example, the user may resize the online environment 302 by clicking a corner the environment display frame and dragging the frame to increase or decrease the online environment to a desirable size. It is to be understood all graphical elements, texts, and other display representations within the display frame of the online environment 302 may be scaled as a function of the user's resizing operation.

The online environment 302 is a source of user-customizable data or information. As such, the online environment 302 aggregates the user-customizable data or information and represents the data or information via integrated, rich, and customizable visual graphical representations on the online environment 302 within one window.

Initially, the online environment 302 receives a selection of a background image 310 from the user (e.g., user 206) to start customizing the online environment 302. For example, the user in this instance may select a personal photography of the Golden Gate Bridge. In one aspect of the invention, the background image 310 is also a graphical representation of the user-customizable data. For example, in this instance, the background image 310 may be a graphical representation of the user's current location.

The online environment 302 also collects the user-customizable data in a profile such as a user profile. Each of the user-customizable data also defines properties associated therewith. For example, one of the user-customizable data may be the user current location and the properties of the user's current location may the postal zip code of the location. Similarly, one of the user-customizable data may be the user's local weather forecast and properties associated with the user's local weather forecast may also be the postal zip code.

In one embodiment, the profile may receive additional information from a third party service. For example, subject to the authorization from either the user, the server 210, or a combination thereof, one or more business entities may supplement the user-customizable data in the profile such that the online environment 302 may integrate or incorporate a graphical representation for display to the user.

Figure 5:
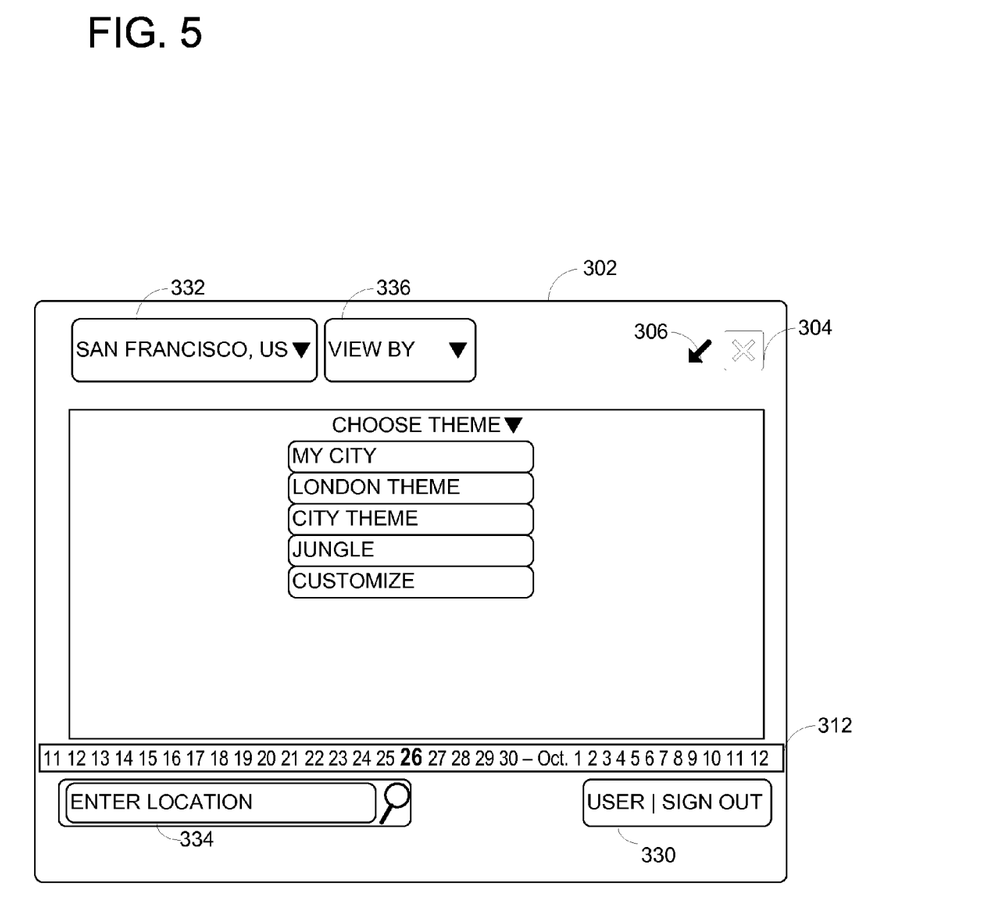

In an alternative embodiment, instead of providing a personal or user-specified background image 310, the user may select one or more themes from the service providers (e.g., the server 210) or a third party vendor. For example, the server 210 may provide a professional photograph of the skyline of London as the background image as a graphical representation of the user's location. While such "theme" fails to provide full user-customization, the provided theme may include additional features to be discussed below. In an alternative embodiment, the user may purchase themes from a third party vendor as the background image that not only provide the properties for the user-customizable data but also include commercial or business incentives, such as coupons or the like. While discussions above describing the background image 310 as mostly a still photograph or image, other animated or motion pictures (e.g., videos) may be used as the background image 310 without departing from the scope or spirit of embodiments of the invention, as illustrated in FIG. 5.

Still referring to FIG. 3, as the online environment 302 has access to the profile of the user, the relevant properties included in the user-customizable data, the background image 310, the online environment 302 identifies one or more graphical elements of the background image 310. In the embodiment of themed background image, the online environment 302 may receive the identified graphical elements from the supplier of the theme images, such as the third party vendor. In the embodiment where the user supplies or assigns the background image 310 from his or her personal image collection, the user may provide or select one or more particular identifiable graphical elements and provide the selected graphical elements to the online environment 302. Illustration of this feature is provided in discussion of FIG. 7. Alternatively, the online environment 302 may apply algorithms on the background image 310 to identify the graphical images based on at least one or more of the following: number of pixels of the background image 310, color variations of the pixels or the like.

The online environment 302 also provides one or more graphical representations for the user. For example, the online environment 302 may provide graphical icons to represent or reflect the user-customizable data. Using FIG. 3 as an example, suppose the user-customizable data includes the following properties:

Date: Sep. 26, 2007;
Time: 10:05 AM;
Local Location: San Francisco, Calif.;
Local Weather condition: Raining;
Contacts information: Display contacts based on online/active status.

Based on the above properties, the online environment 302 renders the appropriate graphical representations onto locations on the background image 310 and the positions of the rendered graphical representation depend on the properties of the user-customizable data corresponding to the graphical representation and the identified graphical elements of the background image. As an illustration, FIG. 3 first illustrates a calendar graphic representation 312 to show the current date (i.e., with "26" having visual emphasis, such as using bold type face font). In one embodiment, the calendar graphical representation 312 may also enable users to go back in time and review/retrieve any information that happened on that day on the calendar. Similarly, the calendar graphical representation 312 may also enable the user to advance the calendar according to the display date into the future to view/retrieve upcoming events. Other implementations other than a horizontal bar for the calendar graphical representation 312 may be employed without departing from the scope or spirit of the present invention.

FIG. 3 also shows a clock 314 indicating the current time. The online environment 302 in FIG. 3 also illustrates raining graphical representation 316, which appears on various positions through the background image 310, being incorporated into the background image 310. In one alternative embodiment, a copy of the original background image 310 may be created and modified based on the rendered graphical representations.

Also, FIG. 3 illustrates one or more contact representations 318 reflecting the active/online status of the contacts. In one embodiment, a relative position or location of each of the contact representations 318 may indicate the various active/online status of a particular contact. For example, in addition to the visual cues of the contact representations 318 (i.e., via color differences), contact representations 318 located or positioned closes to the center of the background image 310 may reflect an active status (e.g., 318-2 and 318-3), while contacts farther way from the center of the background image 310 may reflect away, busy, or even offline status of the contacts. Other graphical representations may be employed as well, such as an umbrella 320, which may mean that the contact 318-2 is active, and a clock 322, which may mean the contact 318-3 is currently away or busy. In another embodiment, other contact representations, icons, avatars, or pictures may be used for the contact representations 318 without departing from the scope or spirit of the invention.

In another embodiment, each of the graphical representations may also be connected with other services for providing alert events. For example, by hovering one of the graphical representations 318 may activate the display of e-mail message alerts or instant messages from that particular contact.

As such, the online environment 302 drastically improves the current implementation of text-based or modular listing of content for the user. Aspects of the invention provide a rich, customizable, and lively experience for the user by incorporating or integrating graphical representations into the background image 310. Instead of always seeing a standard or generic raining icon in a module, as shown in FIG. 3, embodiments of the invention incorporate a graphical representation of the current raining condition into the background image 310. The online environment 302 also avoids the appearance of information overload to the user. In other words, through appropriate management and/or positioning of the graphical representations, the user may not be overwhelmed by the information presented and may be emotionally attached or attuned to the online environment 302.

FIG. 3 also includes one or more controls, such as an authentication status control 330 (e.g., to be used in conjunction with an authentication server), a location indicator control 332, a location search bar 334, and a visual selection control 336. For example, referring to FIG. 4, the visual selection control 336 shows additional options/submenu for customize how much information to be displayed. For example, the user may uncheck one or more of the customizable data (i.e., contacts, time, weather, location, or date). Other controls or buttons may be provided without departing from the scope or spirit of embodiments of the invention.

Figure 6:
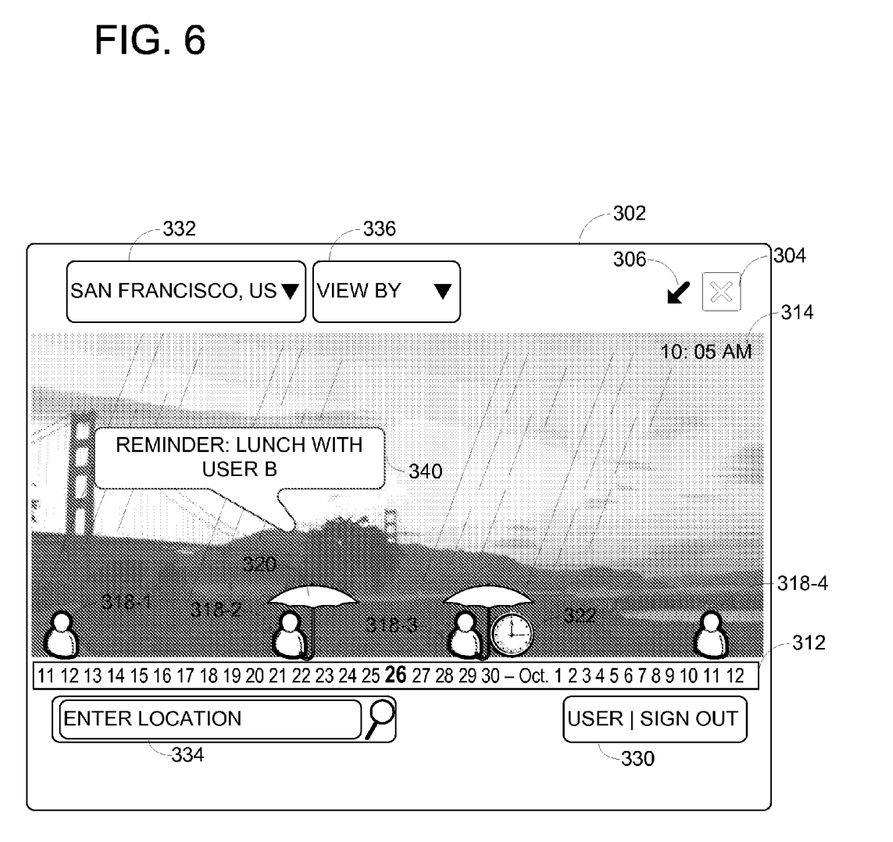

Referring now to FIG. 6, the online environment 302 may update the data included in the user profile. As such, depending on the properties of the user-customizable data, the online environment 302 may appropriately render the graphical representation corresponding to the updated data. In the example illustrated in FIG. 6, suppose the user included in the user profile for displaying information or events relating to his calendar of events. As the profile is updated with the user's calendar, the online environment 302 renders a reminder window 340 for reminding the user of a lunch with USER B.

Figure 7:
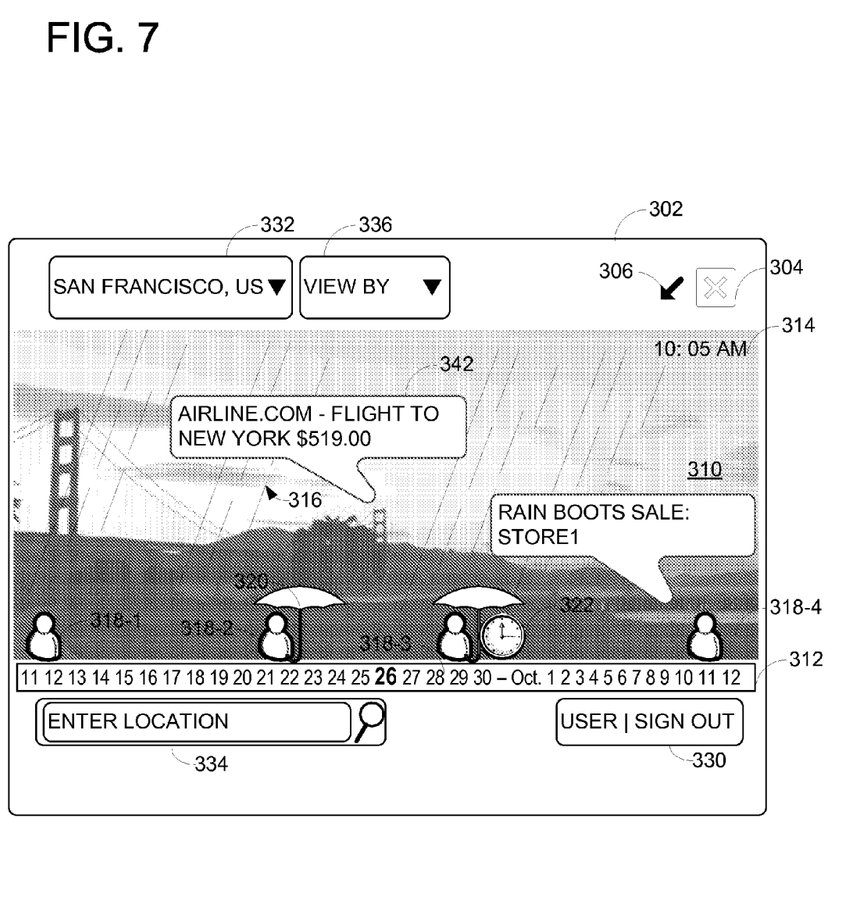

Referring now to FIG. 7, the online environment 302 enables rich user experience based on the identified graphical elements of the background image 310. For example, suppose the Golden Gate Bridge shown in the background image 310 is an identified graphical element by either the user or the online environment 302. The user or the server 210, subject to the user's agreement, may assign that a third party service may provide information or advertisement associated with the identified graphical element. As such, when the user uses an input device, such as a mouse, moves across the background image 310 and hovers the pixels representing the Golden Gate Bridge, a pop advertisement 342 may be rendered to show current offers or promotions from a third party vendor. In the current example, an AIRLINE.com vendor is advertising round-trip flight tickets to New York. Similarly, the user or the server 210 may identify another position on the background image 310 for showing the user sales information for the user's favorite store.

As the online environment 302 is flexible to fit to the display of the client, embodiments of the invention can be incorporated and displayed readily and easily to provide the user with rich and customizable information.

Figure 8:
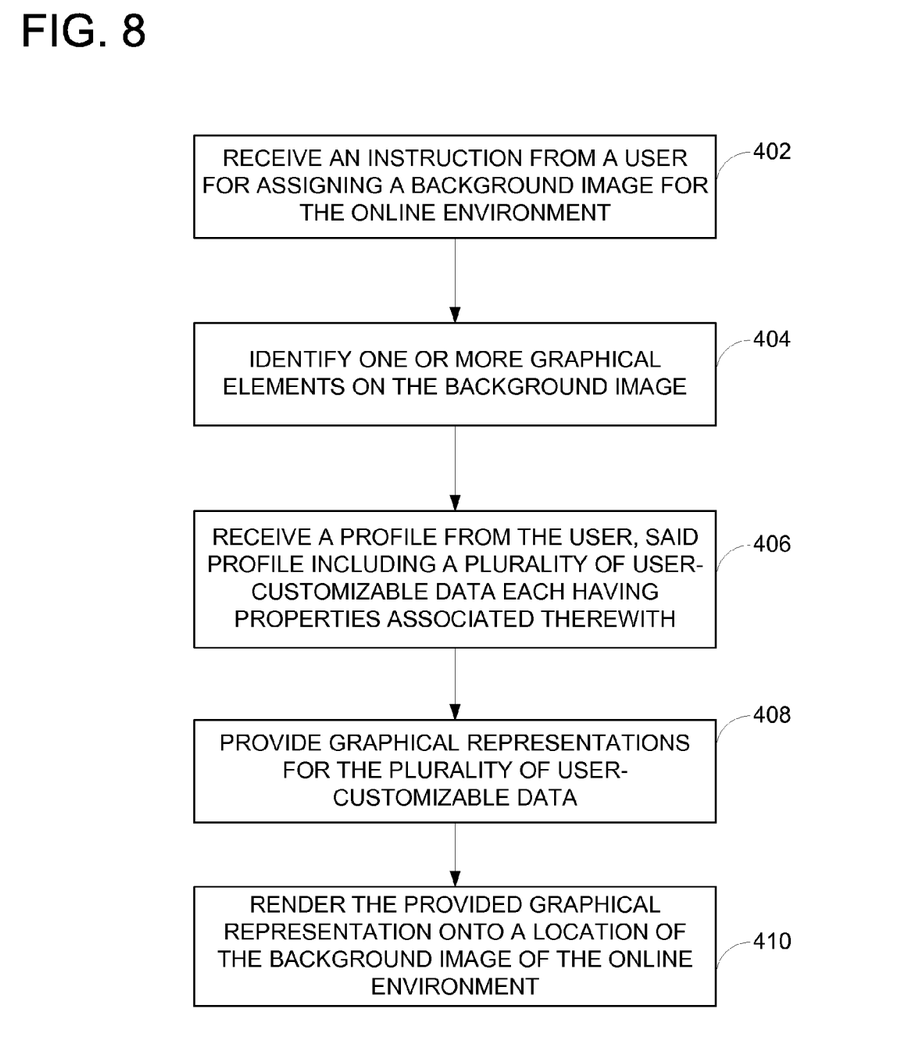
FIG. 8 is a flow diagram illustrating operations for providing a customizable and rich online environment for a user on a client according to an embodiment of the invention.

FIG. 8 illustrates a flow diagram showing operations of providing a customizable online environment for a user on a client according to an embodiment of the invention. In one example, operations illustrated in FIG. 8 are executed by computer-readable medium with computer-executable components for providing a customizable online environment for a user on a client according to an embodiment of the invention. In this example, the computer-readable medium includes both volatile and nonvolatile media, removable and non-removable media, may be any available medium that may be accessed by either the server 210 or the system 200. By way of example and not limitation, computer readable media comprise computer storage media which include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the server 210 or the system 200.

Still referring to FIG. 8, an instruction from the user for assigning a background image for the online environment at 402. The online environment is to be rendered on a display of the client. One or more graphical elements on the background image are identified at 404. A profile from the user is received and the profile includes a plurality of user-customizable data or information each having properties associated therewith at 406. For example, the profile may be part of a user's overall online experience login profile (e.g., such as profile associated with an online account, web portal account, or the like), and the profile includes some personal information (e.g., the user's residence location, the user's preferences in news, the user's online contact list, or the like) associated with the user. At 408, graphical representations are provided for the plurality of user-customizable data. Each of the graphical representations depends on and visually indicates the properties associated with each of the plurality of user-customizable data. At 410, the provided graphical representations are rendered onto a position of the background image of the online environment. The position of the rendered graphical representation depends on the properties of the user-customizable data corresponding to the graphical representation and the identified graphical elements of the background image.

Alternatively, the profile is updated in real time, and the graphical representations are updated as well in response to the updated profile. In such an embodiment, the online environment is re-rendered the online environment with the updated graphical representations. Furthermore, another aspect of the invention may include generating a modified background image incorporating the provided graphical representations as one of the graphical elements of the modified background image. In such an embodiment, the modified background image is rendered on the online environment to the user. A further alternative embodiment includes providing one or more themed images stored in a memory storage area to the user as a background image of the online environment. Instructions may further be received corresponding to a selected themed image from the user for the online environment.

Figure 9:
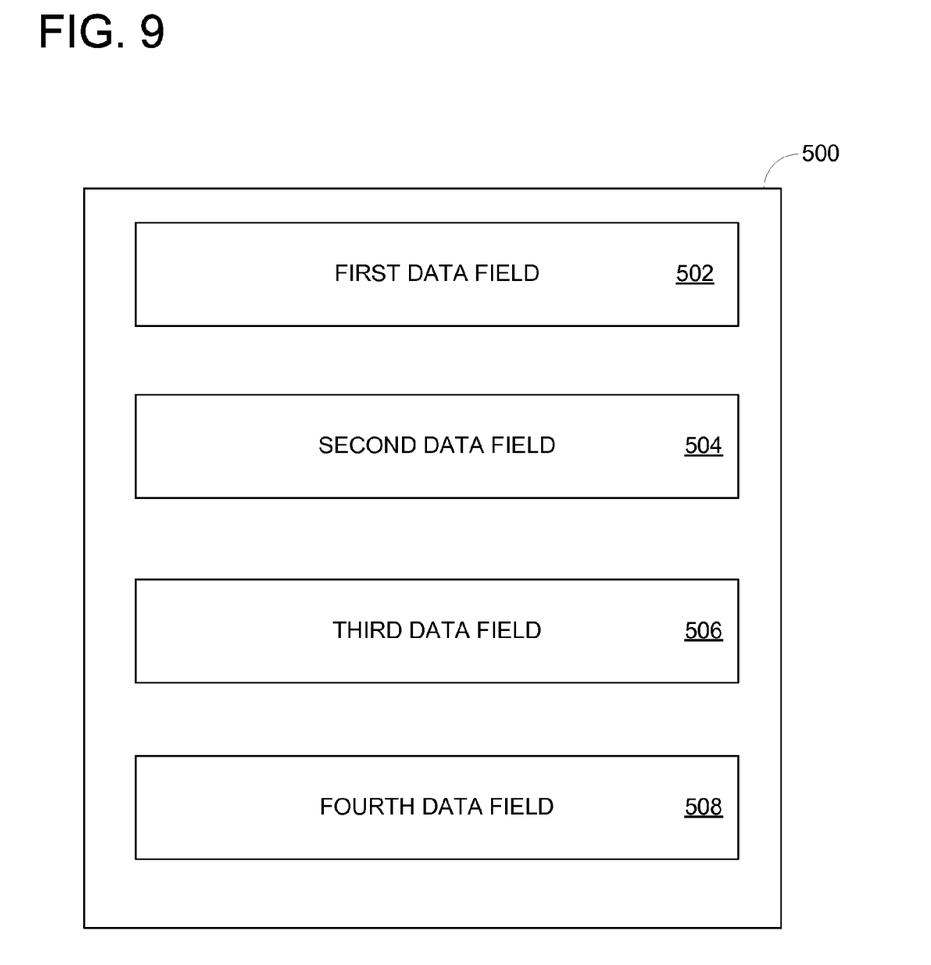
FIG. 9 is a block diagram illustrating a computer-readable medium having a data structure stored thereon with data fields for storing data for a graphical user interface (GUI) to provide a customizable online environment for a user on a client according to an embodiment of the invention.

In yet another embodiment, FIG. 9 illustrates a block diagram showing a computer-readable medium 500 having a data structure stored thereon with data fields for storing data associated with a graphical user interface (GUI) to provide a customizable online environment for a user on a client according to an embodiment of the invention. As previously described, embodiments of the invention may be rendered, displayed, or presented to a user within a online environment, and such online environment may be implemented or substantiated in a client, which may be an application (e.g., software or program), a hardware device (e.g., a portable device, a television, or the like). As such, the computer-readable medium 500 includes a data structure stored thereon that has data fields for storing data for a graphical user interface (GUI) to provide a customizable online environment for a user on a client. A first data field 502 stores a background image of the online environment for display by the client. The background image is assigned by a user, and the client, as previously explained, includes at least one of the following: software and a hardware device with a display. A second data field 504 store data associated with one or more graphical elements of the background image stored in the first data field 502. The data in the second data fields 504 include at least color information, position information, and pixel information of the one or more graphical elements of the background image.

A third data field 506 stores profile data of the user. The profile data includes user-customizable information which includes at least one of the following: weather forecast information of a location, time, and a location. A fourth data field 508 store graphical representations each corresponding to user-customizable information. Each of the graphical representations depends on and visually indicates the user-customizable information stored in the third data field 506. With these data fields in the computer-readable medium 500, the graphical representations stored in the one or more fourth data fields are rendered onto predetermined positions of the background image stored in the first data field 502 upon displaying by the client, and the predetermined positions of the rendered graphical representations depend on the user-customizable information in the profile data of the user in the third data field 506 and the stored data associated with the one or more graphical elements of the background image.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XML) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for providing a customizable online environment for a user on a client, said online environment being hosted by a server connected to said client via a communication data network for rendering on a display of the client, said method comprising:
    receiving an instruction from the user for selecting a background image for the online environment;
    storing a profile of the user, said profile including a plurality of user-customizable data items, each of the data items having properties associated therewith;
    associating at least one of the plurality of user-customizable data items with one or more icons, said icons being different from the background image and depending on and visually indicating the properties of the user-customizable data item associated therewith;
    causing the icons to be rendered on the background image to represent the user-customizable data items in the profile associated with each of the icons;
    integrating at least one of the rendered icons into the background image of the online environment at a particular position, wherein the particular position of the integrated icon depends on the properties of the user-customizable data item associated with the integrated icon; and
    generating an online environment incorporating the selected background image and the rendered icons, including the integrated icon at the particular position in the background image, for rendering to the user, wherein the online environment displays updated user-customizable data associated with the rendered icons.

2. The method of claim 1, further comprising receiving the background image from the user.

3. The method of claim 1, further comprising: updating the profile in real time, updating the icons in response to the updated profile, and causing the online environment to be re-rendered with the updated icons.

4. The method of claim 1, further comprising dynamically modifying a display size of the online environment as a function of a size of the display of the client.

5. The method of claim 1, further comprising providing one or more themed images to the user as a background image of the online environment, and wherein receiving comprises receiving the instruction corresponding to a selected themed image from the user for the online environment.

6. The method of claim 1, further comprising animating the provided icons as a function of the user-customizable data in the profile.

7. The method of claim 1, wherein the client comprises a client device or a client application.

8. The method of claim 1, further comprising incorporating one or more contacts of the user, each of the one or more contacts provided as a contact representation on the background image and located on the background image based on the contact's online status.

9. The method of claim 8, further comprising locating the contact representation having an active online status positioned on the background image at a location of the user.

10. The method of claim 8, further comprising locating the contact representation having an off-line status positioned near far edges of the background image.

11. A system for providing a customizable and rich online environment to be rendered for a user on a display of a client, said online environment hosted by a server connected to said client via a communication data network, said system comprising:
an interface for receiving an instruction from the user for assigning a background image for the online environment, said background image including one or more identifiable graphical elements;
a memory area for storing data and properties associated with the background image, a user profile, and one or more graphical representations different than the identifiable graphical elements of the background image, said user profile including a plurality of user-customizable data each having properties associated therewith;
a processor configured to execute computer-executable instructions for:
receiving, from the user, an identification of one or more of the graphical elements of the background image, wherein the memory area stores data associated with the identified one or more of the graphical elements;
providing, for the plurality of user-customizable data, the graphical representations different than the identifiable graphical elements, said provided graphical representations each depending on and visually indicating the properties associated with each of the plurality of user-customizable data;
integrating at least one of the provided graphical representations into the background image of the online environment at a particular position via the interface, wherein the particular position of the integrated graphical representation depends on the properties of the user-customizable data corresponding thereto and depends on the data associated with the identified one or more of the graphical elements of the background image; and
animating the at least one of the provided graphical representations integrated into the background image as a function of the user-customizable data in the profile in response to the user moving a pointer to hover over the at least one of the provided graphical representations integrated into the background image.

12. The system of claim 11, wherein the processor is further configured to update the user profile stored in the memory area in real time, update the graphical representations in response to the updated user profile, and causing the online environment to be re-rendered with the updated graphical representations.

13. The system of claim 11, wherein the processor is further configured to dynamically modify a display size of the online environment as a function of a size of the display of the client.

14. The system of claim 11, wherein the processor is further configured to generate a modified background image incorporating the provided graphical representations as one of the graphical elements of the modified background image for rendering on the online environment to the user.

15. The system of claim 11, wherein the processor is further configured to provide one or more themed images to the user as a background image of the online environment, and wherein receiving comprises receiving the instruction corresponding to a selected themed image from the user for the online environment.

16. One or more computer-readable storage media having a data structure stored thereon, said data structure having data fields for storing data associated with a graphical user interface (GUI) to provide a customizable online environment to be rendered on a client, said online environment being hosted by a server connected to said client via a communication data network, said data structure comprising:
a first data field for storing a background image of the online environment for display by the client, said background image being assigned by a user of the client;
a second data field for storing data associated with one or more graphical elements within the background image, said one or more graphical elements being identified by the user, said data associated with the identified graphical elements including at least color information, location information, and pixel information of the identified graphical elements within the background image;
a third data field for storing profile data associated with the user, said profile data including user-customizable information, said user-customizable information including at least one of the following: a time, a location, and a weather forecast for the location; and
a fourth data field for storing one or more graphical representations corresponding to the user-customizable information, said graphical representations depending on and visually indicating the user-customizable information stored in the third data field, said graphical representations being different from the identified graphical elements within the background image;
wherein the graphical representations stored in the fourth data field are integrated into the background image at predetermined positions, wherein the positions of the integrated graphical representations depend on the user-customizable information in the profile data of the user and depend on the stored data associated with the identified graphical elements of the background image, and
wherein the first data field is further configured to store a modified background image incorporating the integrated graphical representations stored in the fourth data field.

17. The computer-readable storage media of claim 16, wherein the profile data stored in the third data field is updated in real time; wherein, in response to the updated profile data, the graphical representations are rendered onto positions of the background image upon displaying by the client; wherein, in response to the updated profile data, the positions of the rendered graphical representations depend on the user-customizable information in the profile data and depend on the stored data associated with the one or more graphical elements of the background image.

18. The computer-readable storage media of claim 17, wherein the graphical representations in the fourth data field are rendered in response to the updated profile data as animations.

19. The computer-readable storage media of claim 16, wherein the first data field is further configured to store a dynamically modified background image according to a display area of the client, and wherein the client includes at least one of the following: an instant messenger application, an online portal, a display associated with a game console, a television, and a display associated with a portable electronic device.

20. The computer-readable storage media of claim 16, wherein the first data field further comprises a themed image stored therein, said themed image including preconfigured data for the graphical elements of the second data fields and preconfigured graphical representations for the fourth data field.

* * * * *

UNITED STATES PATENT AND TRADEMARK OFFICE
CERTIFICATE OF CORRECTION

Page 1 of 1

PATENT NO. : 8,601,381 B2
APPLICATION NO. : 11/927524
DATED : December 3, 2013
INVENTOR(S) : Roseway et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1186 days.

Signed and Sealed this
Twenty-first Day of April, 2015

Michelle K. Lee
*Director of the United States Patent and Trademark Office*